(12) United States Patent
Kim et al.

(10) Patent No.: US 11,032,601 B2
(45) Date of Patent: Jun. 8, 2021

(54) ELECTRONIC APPARATUS AND CONTROLLING METHOD THEREOF

(71) Applicant: Samsung Electronics Co., Ltd., Suwon-si (KR)

(72) Inventors: Byuksun Kim, Suwon-si (KR); Kyoungjae Park, Suwon-si (KR); Jinwuk Choi, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 217 days.

(21) Appl. No.: 16/274,427

(22) Filed: Feb. 13, 2019

(65) Prior Publication Data
US 2019/0349622 A1    Nov. 14, 2019

(30) Foreign Application Priority Data
May 10, 2018    (KR) .................. 10-2018-0053529

(51) Int. Cl.
*G06F 3/00* (2006.01)
*G06F 13/00* (2006.01)
(Continued)

(52) U.S. Cl.
CPC ....... *H04N 21/42684* (2013.01); *G10L 15/22* (2013.01); *H04N 21/42203* (2013.01); *H04N 21/42204* (2013.01); *G10L 2015/223* (2013.01)

(58) Field of Classification Search
CPC ....... H04N 21/42684; H04N 21/42203; H04N 21/42204; G10L 15/22; G10L 2015/223
See application file for complete search history.

(56) References Cited

U.S. PATENT DOCUMENTS 5,652,628 A * 7/1997 Toyoshima ............... H04N 5/45
                                                            348/563
8,938,110 B2    1/2015 Goshen et al.
(Continued)

FOREIGN PATENT DOCUMENTS

EP    1 909 202    4/2008
JP    09-42988     2/1997
(Continued)

OTHER PUBLICATIONS

International Search Report and Written Opinion dated May 20, 2019, issued in International Application No. PCT/KR2019/001648.
(Continued)

*Primary Examiner* — Kyu Chae
(74) *Attorney, Agent, or Firm* — Nixon & Vanderhye P.C.

(57) ABSTRACT

An electronic apparatus is provided. The electronic apparatus includes a storage configured to store information related to an identification name corresponding to a content providing source, a communicator comprising communication circuitry, and a processor configured to control the electronic apparatus to obtain information related to the identification name of the content providing source based on at least one of: identification information of the content providing source, an image received from the content providing source and a search result regarding the identification name received through the communicator, map the obtained information onto a different identification name corresponding to the content providing source, and store the mapping information in the storage.

20 Claims, 9 Drawing Sheets

(51) Int. Cl.
 *H04N 5/445* (2011.01)
 *H04N 21/426* (2011.01)
 *H04N 21/422* (2011.01)
 *G10L 15/22* (2006.01)

(56) References Cited

U.S. PATENT DOCUMENTS

| | | | |
|---|---|---|---|
| 2006/0106604 | A1 | 5/2006 | Okimoto |
| 2013/0038795 | A1* | 2/2013 | Hayashi ............... H04N 5/775 348/571 |
| 2013/0145395 | A1* | 6/2013 | Jeong ............... H04N 21/4345 725/40 |
| 2013/0145400 | A1 | 6/2013 | Chang et al. |
| 2014/0123185 | A1* | 5/2014 | Nam ............... H04N 21/6582 725/38 |
| 2015/0170664 | A1 | 6/2015 | Doherty et al. |
| 2015/0189390 | A1 | 7/2015 | Sirpal et al. |
| 2015/0348554 | A1 | 12/2015 | Orr et al. |
| 2016/0062994 | A1* | 3/2016 | Agarwal ............ G06F 16/9535 715/205 |
| 2017/0006329 | A1* | 1/2017 | Jang ................... H04N 21/4782 |
| 2018/0052934 | A1 | 2/2018 | Li et al. |

FOREIGN PATENT DOCUMENTS

| | | |
|---|---|---|
| JP | 3724649 | 12/2005 |
| JP | 6092734 | 3/2017 |
| JP | 6167605 | 7/2017 |
| KR | 10-0989500 | 10/2010 |
| KR | 10-1431835 | 8/2014 |

OTHER PUBLICATIONS

Extended European Search Report dated Mar. 25, 2021 for EP Application No. 19799398.3.

* cited by examiner

FIG. 7

| Case | IDENTIFICATION NAME | FIRST DIFFERENT IDENTIFICATION NAME | SECOND DIFFERENT IDENTIFICATION NAME |
|---|---|---|---|
| 1. LONG NAME AND SHORT NAME | Abc Cde Efg | ACE | Abc Cde |
| 2. SEVICE NAME AND BUSINESS NAME | AAA (SERVICE NAME) | BBB (BUSINESS NAME) | |
| 3. NAME BEFORE OR AFTER MERGER AND ACQUISITION | CCC | DDD | |
| 4. MANUFACTURER NAME | EEE | FFF | |
| 5. MULTI-LINGUAL TRANSLATION | KK TV | KOREAN BROADCAST | |

ELECTRONIC APPARATUS AND CONTROLLING METHOD THEREOF

CROSS-REFERENCE TO RELATED APPLICATION

This application is based on and claims priority under 35 U.S.C. 119 to Korean Patent Application No. 10-2018-0053529, filed on May 10, 2018 in the Korean Intellectual Property Office, the disclosure of which is herein incorporated by reference in its entirety.

BACKGROUND

Field

The disclosure relates to an electronic apparatus that obtains various names regarding a content providing source and a controlling method thereof.

Description of Related Art

Generally, an electronic apparatus receives content sources from the application installed in a peripheral apparatus (a set top box, a Blu-Ray player, a speaker, a mobile, a PC, etc.) connected to the electronic apparatus or in the electronic apparatus and which provides contents.

In a related art, there has been an inconvenience that in order to select such peripheral apparatus or an application (hereinafter referred to as a content providing source), the name of the content providing source should be accurately uttered by a voice or input. In addition, there has been a problem that if an abbreviation of the content providing source or the name before a change is input, the electronic apparatus does not recognize the input name.

SUMMARY

According to an example embodiment of the disclosure, an electronic apparatus that may recognize the name of a content providing source even if the name is input in various forms, and a controlling method thereof are provided.

According to an example embodiment, an electronic apparatus is provided, the electronic apparatus including a storage configured to store information related to an identification name corresponding to a content providing source, a communicator comprising communication circuitry, and a processor configured to control the electronic apparatus to: obtain information related to the identification name of the content providing source based on at least one of identification information of the content providing source, an image received from the content providing source and a search result regarding the identification name received through the communicator, map the obtained information onto a different identification name corresponding to the content providing source, and store the mapping information in the storage.

The processor may be configured to, based on the different identification name being included in a user command, recognize the user command as a selection command of the content providing source and perform an operation corresponding to the user command.

The user command may be a voice command of a user.

The processor may be configured to, based on the different identification name being included in a text corresponding to a voice recognition result regarding the user voice command, recognize the user voice command as a selection command of the content providing source and perform an operation corresponding to the user command.

The processor may be configured to transmit a keyword related to the identification name and a keyword related to a change of the identification name to an external server, and based on a search result regarding the identification name and a search result regarding the keyword being received from the external server, map information included in the search result onto a different identification name of the content providing source, and store the mapping information.

The processor may be configured to obtain information related to the identification name of the content providing source by performing image processing on a predetermined logo area of the received image.

The processor may be configured to, based on there being a plurality of different identification names, assign a priority order to the plurality of different identification names based on a frequency of use of the plurality of different identification names, and map the plurality of different identification names onto the content providing source.

The processor may be configured to, based on a user command being input, identify (determine) whether the user command includes the different identification name by comparing the user command with the plurality of different identification names in sequence based on the priority order.

The electronic apparatus may further include a display.

The processor may be configured to, based on a frequency of use of the different identification name being higher than a frequency of use of the identification name, control the display to provide information on the content providing source based on the different identification name.

The processor may be configured to, based on a subordinate name of the identification name and/or a subordinate name of the different identification name being included in a user command, recognize the user command as a selection command of a content providing source corresponding to the identification name and/or the different identification name, and perform an operation corresponding to the user command.

The processor may be configured to, based on there being a plurality of content providing sources corresponding to the subordinate name, provide a user interface (UI) for obtaining a selection of one of the plurality of content providing sources.

The processor may be configured to assign a priority order to the plurality of content providing sources based on a frequency of selection of a user, and based on the subordinate name being included in the user command, recognize the user command as a selection command of a content providing source having a highest priority order among the plurality of content providing sources.

The identification information may be information included in an infoframe.

The content providing source may be configured to include at least one of a content provider and a content providing apparatus.

A method for controlling an electronic apparatus storing information related to an identification name corresponding to a content providing source is provided. The method may include obtaining information related to the identification name of the content providing source based on at least one of identification information of the content providing source, an image received from the content providing source and a search result regarding the identification name, mapping the obtained information onto a different identification name corresponding to the content providing source, and storing the mapping information.

The method may further include, based on the different identification name being included in a user command, recognizing the user command as a selection command of the content providing source and performing an operation corresponding to the user command.

The user command may be a voice command of a user.

The performing an operation may include, based on the different identification name being included in a text corresponding to a voice recognition result regarding the user voice command, recognizing the user voice command as a selection command of the content providing source and performing an operation corresponding to the user command.

The storing may include transmitting a keyword related to the identification name and a keyword related to a change of the identification name to an external server, and based on a search result regarding the identification name and a search result regarding the keyword being received from the external server, mapping information included in the search result onto a different identification name of the content providing source, and storing the mapping information.

The obtaining information may include obtaining information related to the identification name of the content providing source by performing an image processing on a predetermined logo area of the received image.

The controlling method may further include, based on there being a plurality of different identification names, assigning a priority order to the plurality of different identification names based on a frequency of use of the plurality of different identification names, and mapping the plurality of different identification names onto the content providing source, and based on a user command being input, identifying whether the user command includes the different identification name by comparing the user command with the plurality of different identification names in sequence based on the priority order.

The controlling method may further include, based on a frequency of use of the different identification name being higher than a frequency of use of the identification name, providing information on the content providing source based on the different identification name.

A non-transitory computer readable medium which stores a computer program that, when executed by a processor, enables an electronic apparatus to perform an operation, wherein the operation includes obtaining information related to the identification name of the content providing source based on at least one of identification information of the content providing source, an image received from the content providing source and a search result regarding the identification name, mapping the obtained information onto a different identification name corresponding to the content providing source, and storing the mapping information.

According to various embodiments as described above, even if the name of a content providing source is input in various forms, the electronic apparatus may recognize the content providing source intended by a user, and thus, may provide a convenience to the user.

BRIEF DESCRIPTION OF THE DRAWINGS

The above and other aspects, features and advantages of various example embodiments of the present disclosure will be more apparent from the following detailed description, taken in conjunction with the accompanying drawings, in which:

FIG. 7 is a diagram illustrating an example of types of different identification names according to an embodiment of the disclosure;

DETAILED DESCRIPTION

Figure 1:
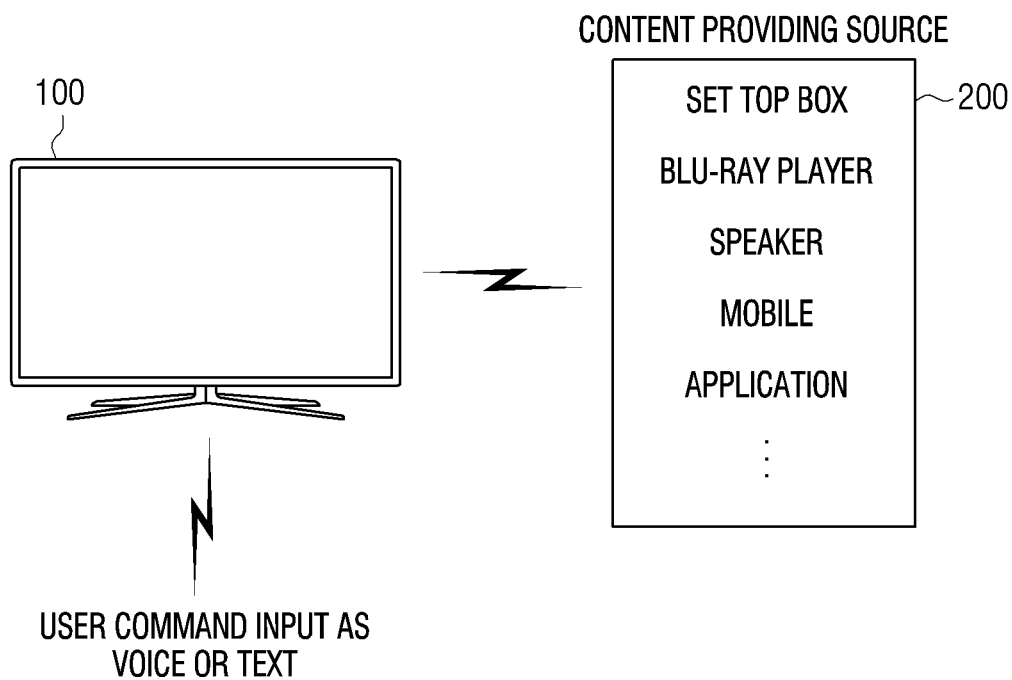
FIG. 1 is a diagram illustrating an example configuration of an electronic system according to an embodiment of the disclosure.

Below, various example embodiments of the disclosure will be described in greater detail with reference to the accompanying drawings. In describing the various example embodiments, a detailed description of relevant known functions or components may be omitted if it would obscure the description of the subject matter. In addition, the example embodiments may be changed in various forms, and therefore, the technical scope is not limited to the following embodiments. Rather, these example embodiments are provided to make the disclosure thorough and complete for those skilled in the art.

Unless explicitly described otherwise, the term 'including' will be understood to imply the inclusion of a component, but not the exclusion of any other components. Further, various elements and areas in the drawings are schematically drawn. Therefore, the technical ideas are not limited by a relative size or interval drawn in the accompanying drawings.

Also, 'at least one of a, b or c' may be understood as 'only a', 'only b', 'only c', 'both a and b', 'both a and c', 'both b and c', 'all of a, b, and c', or variations thereof.

Hereinafter, the disclosure will be described in greater detail with reference to the attached drawings.

FIG. 1 is a diagram illustrating an example configuration of an example electronic system according to an embodiment of the disclosure.

Referring to FIG. 1, an electronic system 10 according to an embodiment includes an electronic apparatus 100 and a content providing source 200.

The electronic apparatus 100 may be implemented, for example, and without limitation, as a TV which may receive contents from the content providing source 200, but it is not limited thereto, and may be implemented as, for example, and without limitation, a set top box or a Blu-Ray player that does not include a display, which is an apparatus that receives a content and transmits the content to a display apparatus. The electronic apparatus 100 may be implemented, for example, and without limitation, as a personal computer (PC), a laptop computer, a tablet, a smartphone, and so on.

The content providing source 200 may refer, for example, to a subject which provides a content to the electronic apparatus 100. The content providing source 200 may include, for example, at least one of a content provider and a content providing apparatus. The content provider may be implemented as an application which is installed in the electronic apparatus 100 and provides a content. The content providing apparatus may be implemented as, for example, and without limitation, a set top box, a Blu-Ray player, a speaker, a mobile phone, or the like connected to the electronic apparatus 100.

According to an embodiment of the disclosure, the electronic apparatus 100 may obtain various identification names regarding the content providing source providing a content to the electronic apparatus 100, so that even if a user inputs the content providing source as a name different from a representative name, the electronic apparatus 100 may recognize that the input content providing source is the content providing source intended by the user. Various example embodiments of the disclosure will be described in greater detail below with reference to drawings.

Figure 2:
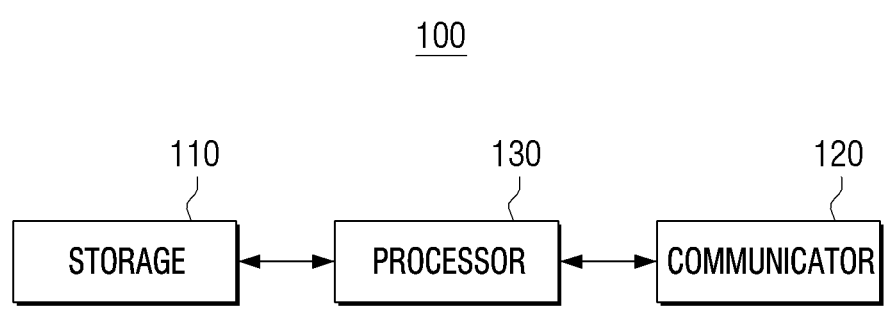
FIG. 2 is a block diagram illustrating an example configuration of an electronic apparatus according to an embodiment of the disclosure.

FIG. 2 is a block diagram illustrating an example configuration of an example electronic apparatus according to an embodiment of the disclosure.

According to FIG. 2, the electronic apparatus 100 may include a storage 110, a communicator (e.g., including communication circuitry) 120, and a processor (e.g., including processing circuitry) 130.

The storage 110 may store various types of data, programs, and/or applications for driving/controlling the electronic apparatus 100. The storage 110 may store a controlling program for controlling the electronic apparatus 100 and the processor 130, the application, databases, and/or related data initially provided by or a manufacturer or downloaded from an outside.

The storage 110 may store the information in which an identification name corresponding to the content providing source 200 is mapped. For example, if a set top box of "company AAA" is connected to the electronic apparatus 100, at least one of a name or a logo corresponding to the identification name (e.g., AAA) of "company AAA" may be stored in the storage 110.

In addition, the storage 110 may store a different identification name which is a different name of a specific content providing source 200 corresponding to the identification name by the processor 130. The different identification name may, for example, be the name of which meant content providing source 200 is the same as that of the identification name stored in the storage 110 but of which name is different from that of the stored identification name. For example, if the identification name stored in the storage 110 is the manufacturer name of the content providing source 200, the different identification name may be at least one of a service name, a manufacturer name, a brand name, a name before or after merger and acquisition or an abbreviation.

For example, if the identification name is "AAA" which is a business name, "BBB" which is a brand name of "AAA" may be obtained by the processor 130 as a different identification name and stored in the storage 110.

The communicator 120 may include various communication circuitry and may be a configuration that communicates with an external server (not illustrated). The communicator 120 may be implemented as various communication modules including various communication circuitry, such as, for example, and without limitation, BlueTooth (BT), Wireless Fidelity (WI-FI), Wi-Fi Direct, Zigbee, Serial Interface, Universal Serial Bus (USB), Near Field Communication (NFC), Z-wave, or the like.

For example, the communicator 120 may transmit the key word regarding the identification name of the content providing source and the key word regarding the change of the identification name to an external server and receive a search result from the external server, by a control of the processor 130.

The processor 130 may include various processing circuitry and control an overall operation of the electronic apparatus 100.

According to an embodiment, the processor 130 may be implemented using various processing circuitry, such as, for example, and without limitation, a digital signal processor (DSP) that processes a digital signal, a microprocessor, a Time controller (TCON), or the like. However, it is not limited thereto and the processor 130 may include one or more than one of, for example, and without limitation, a central processing unit (CPU), a Micro Controller Unit (MCU), a micro processing unit (MPU), a controller, an application processor (AP), a communication processor (CP), an ARM processor, or the like or may be defined as the corresponding term. In addition, the processor 130 may be implemented as a System on Chip (SoC) or a large scale integration (LSI) in which a processing algorithm is embedded, or implemented in a form of Field Programmable gate array (FPGA).

The processor 130 may obtain information regarding the identification name of the content providing source 200 based on at least one of the identification information of the content providing source 200, the image received from the content providing source 200 or the identification name received through the communicator 120.

The identification information of the content providing source 200 may be information included in an infoframe. The infoframe may be in a structure in which data transmitted from a source to sync is included, and the data may include, for example, and without limitation, a video stream, audio stream, identification information, or the like. The identification information may be the information indicating the corresponding content providing source 200. For example, the identification information may include an intrinsic identification number, identification name, or the like, of the corresponding content providing source 200.

The identification name may be, for example, and without limitation, at least one of a brand name, a service name, a business name, a manufacturer name, a name before or after merger and acquisition, a logo, or the like.

The processor 130 may obtain an identification name or a different identification name of the content providing source 200 based on the information included in the infoframe. For example, the business name, a brand name, a manufacturer name, or the like, of the corresponding content providing source 200 are included in the infoframe, and thus, the processor 130 may obtain various names which indicate the corresponding content providing source 200.

According to another embodiment, the processor 130 may obtain information on the identification name of the content providing source 200 based on the image received from the content providing source 200. For example, the processor 130 may obtain the brand name of the content providing source 200, "AAA", included in the image received from the content providing source 200.

For example, in case the identification information of a specific content providing source 200 included in the infoframe is the same but the identification name included in the image received from the corresponding content providing source 200 is different from the previous identification name, the identification name included in the received image may be identified as a different name and stored in the storage 110.

For example, if the identification information included in the infoframe received from the first content providing source is "AAA" and the identification information included in the infoframe received from the second content providing source is also "AAA" but the name included in the image received from the first content providing source is "AAA" and the name included in the image received from the second content providing source is "BBB", the processor 130 may recognize "BBB" as another identification name of "AAA" and store "BBB" in the storage 110.

The processor 130 may identify the name included in the image based on an Optical Character Reader (OCR), the image recognition technology, etc. The OCR and the image recognition technology are conventional arts, and thus, the detailed description thereof will not be provided here.

The processor 130 may obtain information regarding different identification name related to the identification name based on the search result related to the identification name through an external server (not illustrated).

According to an embodiment, the processor 130 may transmit a key word regarding the identification name and a key word regarding the change of the identification name to the external server and if the search result regarding the identification name and a key word is received from the external server, the processor 130 may obtain the information included in the search result. The key word regarding the change of the identification name may be at least one of merger, acquisition, change of a name or change of an abbreviation or a logo.

The external server may search a web document in which the key word regarding the identification name is included together with the key regarding the change of the identification name, identify the information regarding the identification name in the searched web document, and transmit the corresponding information to the electronic apparatus 100.

For example, the processor 130 may transmit the identification name "AAA" and the key word "merger or acquisition" to the external server through the communicator 120. The external server may identify the web document, etc. in which "AAA" is indicated together with "merger or acquisition", obtain "BBB" which is the name changed after a merger or an acquisition, and transmit "BBB" to the electronic apparatus 100.

According to another embodiment, the external server may transmit the web document, or the like, in which the key word regarding the identification name and the key word regarding the change of the identification name are indicated to the electronic apparatus 100, and the processor 130 may identify the information regarding the identification name in the web document, etc. received from the external server.

For example, the external server may search the web document in which "AAA" is indicated together with "merger or acquisition" and transmit the searched web document to the electronic apparatus 100, and the processor 130 may obtain "BBB" which is the name changed after the merger or the acquisition from the web document, etc. received from the external server.

According to another embodiment, the processor 130 may transmit only the identification name to the external server. The external server may transmit the web document, etc. regarding the identification name to the electronic apparatus 100 or analyze the web document and transmit the analysis result related to the identification name to the electronic apparatus 100.

The processor 130 may obtain information on a different identification name based on a web clustering. The clustering may refer, for example, to a method for obtaining information based on the similarity.

The processor 130 may transmit the identification name of the content providing source 200 to an external server, and the external server may obtain the search result regarding the name similar to the identification name from the web document, etc. based on the OCR, etc. If the search result is received from the external server, the processor 130 may obtain the information on the name similar to the identification name from the search result.

According to another embodiment, the processor 130 may transmit the key word regarding the identification name of the content providing source 200 and the key word regarding the change of the identification name to an external server. In addition, if the web document, etc. in which a similar name is searched is received from an external server, the processor 130 may obtain the information regarding the name similar to the identification name from the received web document, etc. based on the OCR, etc.

The processor 130 may map the obtained information onto different identification name corresponding to the content providing source 200 and store the mapping information in the storage 110. Accordingly, the processor 130 may recognize that the pre-stored identification name and the different identification name obtained by the above-mentioned operation correspond to the same content providing source 200.

If the different identification name is included in a user command, the processor 130 may recognize the user command as a selection command of the content providing source 200 and perform the operation corresponding to the user command.

For example, suppose that the different identification name of the content providing source of which identification name is "AAA" is "BBB". If the user command input to the electronic apparatus 100 is "turn on BBB" or "turn on channel 501 in BBB", the processor 130 may identify "BBB" in the user command and recognize the user command as the command for selecting a content providing source corresponding to "BBB". Accordingly, the processor 130 may select and execute the content providing source corresponding to "BBB" based on the user command, or execute the content providing source corresponding to "BBB" and execute channel 501 included in the corresponding content providing source. The content providing source 200 corresponding to "BBB" may be the same as the content providing source corresponding to "AAA".

If a subordinate name of the identification name or a subordinate name of the different identification name are included in the user command, the processor 130 may recognize the user command as a selection command of the content providing source 200 corresponding to the identification name or the different identification name including the subordinate name, and perform an operation corresponding to the user command. For example, if there is a broadcast channel included in the content providing source 200, the name of the corresponding broadcast channel may be a subordinate name of the corresponding content providing source.

According to an embodiment, even if the identification name or the different identification name is not included in the user command, if a subordinate name of the identification name or a subordinate name of the different identification name is included in the user command, the processor 130 may recognize the user command as a selection command of the content providing source 200 corresponding to the subordinate name, execute the content providing source 200 including the corresponding subordinate name and execute the content corresponding to the subordinate name.

If there is are a plurality of content providing sources 200 corresponding to the subordinate name, the processor 130 may provide a UI for obtaining a selection of one of the plurality of content providing sources.

For example, suppose the case that channel "OCC" is included in "AAA" and "BBB" which are content providing sources, that is, that the channel name of "OCC" is a subordinate name of "AAA" and "BBB". If "OCC" is included in a user command, the processor 130 may provide a UI for obtaining a selection of one of the content providing sources, "AAA" or "BBB".

According to an embodiment, the processor 130 may assign a priority order to a plurality of content providing sources based on the frequency of selection of a user, and if a subordinate name is included in the user command, recognize the user command as a selection command of a content providing source of which priority order is the highest among the plurality of content providing sources, and perform the operation corresponding to the user command.

For example, if channel "OCC" is included in the user command and a UI for obtaining a selection of one of "AAA" or "BBB" is provided, and if it is identified that the frequency of obtaining a selection of "AAA" from a user reaches a predetermined number prior to the frequency of obtaining a selection of "BBB", the processor 130 may execute channel "OCC" by automatically executing a content providing source "AAA" without providing an additional UI when the channel "OCC" is included in the user command. If one of the plurality of content providing sources is set by a user, the processor 130 may recognize the user command as the selection commend of the set content providing source regardless of the frequency of selection.

If an identification name different from the different identification name is included in the user command, the processor 130 may execute the content providing source 200 corresponding to the identification name.

For example, if a user command input to the electronic apparatus 100 is "turn on AAA", the processor 130 may recognize the user command as a command for selecting a content providing source corresponding to "AAA" and execute the user command.

The user command may be a voice command of a user. If a different identification name is included in a text corresponding to the voice recognition result regarding a user voice command, the processor 130 may recognize the user command as a selection command of the content providing source 200 and perform an operation corresponding to the user command.

The processor 130 may identify the user command through a microphone (not illustrated). The microphone may be included in the electronic apparatus 100 or in a remote controller (not illustrated) for controlling the electronic apparatus 100.

According to an embodiment, if a microphone is included in the electronic apparatus 100, the processor (not illustrated) included in the microphone may digitalize the received analogue voice signal and transmit the digital signal to the electronic apparatus 100.

According to another embodiment, if a microphone is included in a remote controller, the processor (not illustrated) included in the remote controller may digitalize the received analogue voice signal and transmit the digital signal to the electronic apparatus 100 through a communication method such as Bluetooth, etc. In addition, a remote controller application is installed in the user terminal apparatus (not illustrated) including a microphone to be used as a remote controller.

The processor 130 may transmit the digital voice signal to a server (not illustrated) regarding a voice recognition, and recognize the user command based on the voice recognition result received from the server regarding the voice recognition. The server regarding a voice recognition may serve as a Speech to Text (STT) server that converts a voice signal into a text. The STT server may convert a voice signal into a text and transmit the converted voice recognition result to the electronic apparatus 100.

According to another embodiment, the processor 130 may include the STT function, and recognize the user command by converting the received voice signal into a text.

The processor 130 may obtain the information regarding the identification name of the content providing source 200 by performing an image processing on a predetermined logo area of the received image.

The processor 130 may store the existing logo in the storage 110 based on the image processing such as an infoframe or an image recognition. Thereafter, if the logo is changed, the processor 130 may store the changed logo in the storage 110 through the image processing.

For example, in case the identification information of the content providing source 200 included in the infoframe is the same but the logo identified by the image processing is different from the pre-stored logo, the processor 130 may store the changed logo in the storage 110.

The processor 130 may obtain a different identification name based on the changed logo. For example, suppose that the logo before the change is the first logo, and the logo after the change is the second logo, and suppose that according to the above-described operation, the processor 130 recognizes that the first logo and the second logo are the logo of the same content providing source 200. If the name of the content providing source 200 that previously used the first logo and name of "AAA" is changed into "BBB" and the first logo is changed into the second logo and the changed logo is displayed, the processor 130 may recognize "BBB" as a different identification name of "AAA" based on that the second logo stored in the storage 110 is a different identification name of the first logo. Accordingly, "BBB" may be mapped onto the identification name of the corresponding content providing source and stored in the storage 110.

If there are a plurality of different identification names, the processor 130 may assign a priority order to the plurality of different identification names based on the frequency of use of the plurality of different identification names, and map the plurality of different identification names onto the content providing source 200.

For example, suppose that there are three different identification names, "BBB", "CCC", and "DDD". The processor 130 may identify the frequency of use of the different identification names in the user command, and assign the priority order based on the frequency of use. For example, the processor 130 may assign the highest priority order to "BBB" and assign the lowest priority order to "DDD".

If a user command is input, the processor 130 may identify whether the user command includes the different identification name by comparing the user command with the plurality of different identification names in sequence based on the priority order.

For example, first, the processor 130 may compare the user command with "BBB" to which the highest priority order is assigned, and compare the user command with "CCC" and then compare the user command with "DDD" so as to identify whether the different identification name is included in the user command. For example, if the user command input to the electronic apparatus 100 is "turn on BBB" or "turn on channel 501 on BBB", the processor 130 may compare the user command with "BBB" of which priority order is the highest and identify whether the corresponding different identification name is included in the user command. As the processor 130 compares the user command according to the priority order, the burden of calculation of the processor 130 may be reduced.

If a frequency of use of the different identification name is higher than a frequency of use of the identification name, the processor 130 may control a display (not illustrated) to provide information on the content providing source 200 based on the different identification name.

For example, the name indicating the content providing source 200 may be displayed on the display by each content providing source 200. For example, on the UI including the plurality of content providing sources 200, the identification name such as "AAA", "BBB" or "CCC" that indicates each content providing source 200 may be displayed. However, if the frequency of use of "PPP" which is a different identification name of "AAA" is higher than the use of frequency of "AAA", the processor 130 may change "AAA" displayed on the UI of the display into "PPP" and display "PPP". The processor 130 may provide a convenience to a user by displaying the name mainly used by a user based on the frequency of use of the user.

If a display is not included in the electronic apparatus 100, if the frequency of use of a different identification name is higher than the frequency of use of an identification name, the processor 130 may transmit the signal including the information on the content providing source 200 to an external display apparatus through an interface (not illustrated) based on the different identification name.

If a new content providing source 200 is identified, the processor 130 may obtain the information regarding the identification name and regarding the different identification name of the corresponding content providing source 200 based on at least one of identification information included in an infoframe of the new content providing source 200, an image received from the corresponding content providing source 200 or a search result regarding the corresponding content providing source 200 in the external server, and map the obtained information onto the different identification name of the content providing source 200 and store the mapping information in the storage 110.

According to another embodiment, the processor 130 may recommend a different identification name to a user based on the obtained information and obtain a selection of an appropriate different identification name from a user.

According to another embodiment, the processor (not illustrated) of the external sever may obtain information regarding the identification name of the content providing source 200 based on at least one of identification information of the content providing source 200 received from the electronic apparatus 100, an image received from the content providing source 200 or a search result regarding the identification name, and transmit the information generated by mapping the obtained information onto the different identification name of the content providing source 200 to the electronic apparatus 100.

The detailed operation of the processor of the external server may be the same as or similar to the operation of the processor 130 of the electronic apparatus 100, and thus, the detailed description thereof will not be repeated here.

Figure 3:
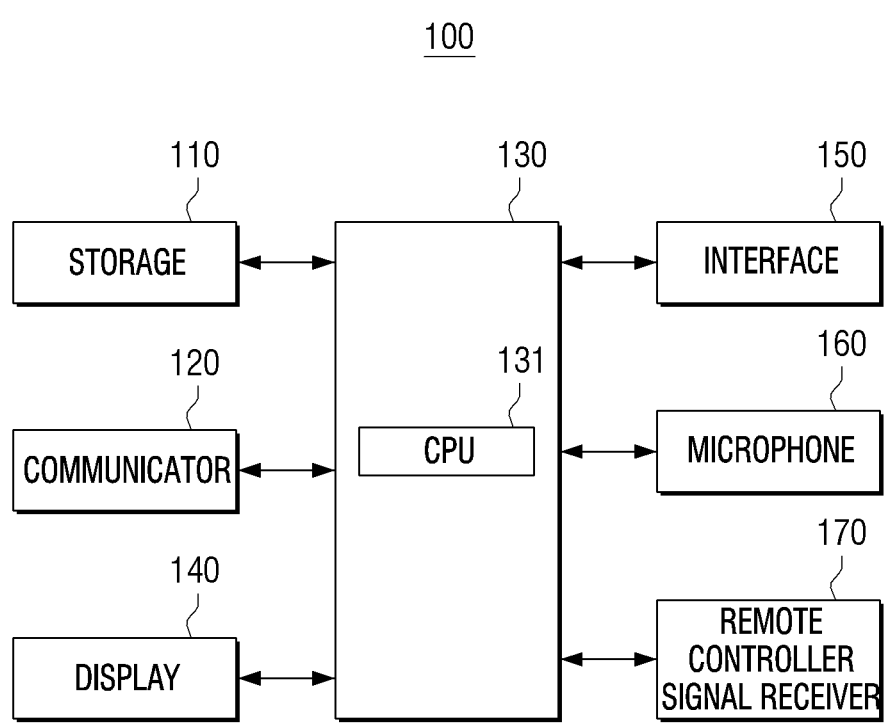
FIG. 3 is a block diagram illustrating an example configuration of an electronic apparatus of FIG. 2 according to an embodiment of the disclosure.

FIG. 3 is a block diagram illustrating an example configuration of the example electronic apparatus of FIG. 2 according to an embodiment of the disclosure.

Referring to FIG. 3, the electronic apparatus 100 may include the storage 110, the communicator (e.g., including communication circuitry) 120, the processor (e.g., including processing circuitry) 130, a display 140, an interface 150, a microphone 160, and a remote controller signal receiver (e.g., including receiving circuitry) 170.

The storage 110 may be implemented as an interior memory such as a ROM or a RAM included in the processor 130, or implemented as a memory separated from the processor 130. In this example, the storage 110 may be implemented as a form of a memory embedded in the electronic apparatus 100 or as a form of a memory which may be attached to or detached from the electronic apparatus 100, according to a data storing usage. For example, the data for driving the electronic apparatus 100 is stored in the memory embedded in the electronic apparatus 100, and the data for an enlargement function of the electronic apparatus 100 may be stored in the memory which can be attached to or detached from the electronic apparatus 100. Meanwhile, the memory embedded in the electronic apparatus 100 may be implemented in a form of a non-volatile memory, a volatile memory, a hard disc drive (HDD), or a solid-state drive (SSD).

The processor 130 may include various processing circuitry, including, for example, and without limitation, a CPU 131, a ROM (or a non-volatile memory) in which a control program for controlling the electronic apparatus 100 is stored, and a RAM (or a volatile memory) used to store data input from an outside of the electronic apparatus 100 or used as a storage area corresponding to various operations performed in the electronic apparatus 100.

If a predetermined event occurs, the processor 130 may execute an Operating System (OS), a program, or various applications stored in the storage 110. The processor 130 may include, for example, and without limitation, a single core, a dual core, a triple core, a quad core, a core of a multiple thereof, or the like.

The CPU 131 may access the storage 110 to perform a booting using the OS stored in the storage 110. In addition, the CPU 131 may perform various operations using various programs, contents, data, etc. which are stored in the storage 110.

The display 140 may display in image content or an abstract image thereof. The display 140 may be implemented as various forms such as, for example, and without limitation, a liquid crystal display (LCD), an organic light emitting diode (OLED), a liquid crystal on silicon (LCoS), a digital light processing (DLP), a quantum dot (QD) display panel, or the like.

However, the electronic apparatus may be implemented as apparatus (e.g., a TV) including the display 140 as illustrated in FIG. 3, but the a set top box or a Blu-Ray player that does not include the display 140 may be implemented and accordingly, the electronic apparatus 100 may receive a content and transmit the received content to an external display apparatus through the interface 150.

The interface 150 may include various interface circuitry and be implemented as an input/output port that transmits a signal to or receives a signal from an external electronic apparatus (not illustrated). For example, the video and audio signals may be received from the external electronic apparatus such as a set top box through the interface 150, and the video and audio signals may be transmitted to an external electronic apparatus or an external display apparatus such as a speaker.

For example, the interface 150 may transmit both of the video and audio signals to or receive both of the video and audio signals from the external electronic apparatus or transmit each of the video and audio signals to or receive each of the video and audio signals from the external electronic apparatus by a control of the processor 130. For example, if both the video and audio signals are transmitted to the external electronic apparatus, the interface 150 may be implemented as, for example, and without limitation, a High Definition Multimedia Interface (HDMI), a Display Port (DP), a Red Green Blue (RGB), a Digital Visual Interface (DVI), a thunderbolt, or the like.

The microphone 160 receives a voice uttered by the user. The microphone 160 may be included in the electronic apparatus 100 or included in the remote controller. A remote controller application may be installed in the user terminal apparatus including the microphone 160 so as to be used as a remote controller.

The remote controller signal receiver 170 may include various signal receiving circuitry and receive a remote controller signal sent from the remote controller (not illustrated). The remote controller signal receiver 170 may be implemented, for example, and without limitation, as an Infra-Red (IR) module, but it is not limited thereto. For example, if a remote controller signal is received in a Bluetooth method, the remote controller signal receiver 170 may be not separately included, and a Bluetooth module in the communicator 120 may act as the remote controller signal receiver.

Figure 4:
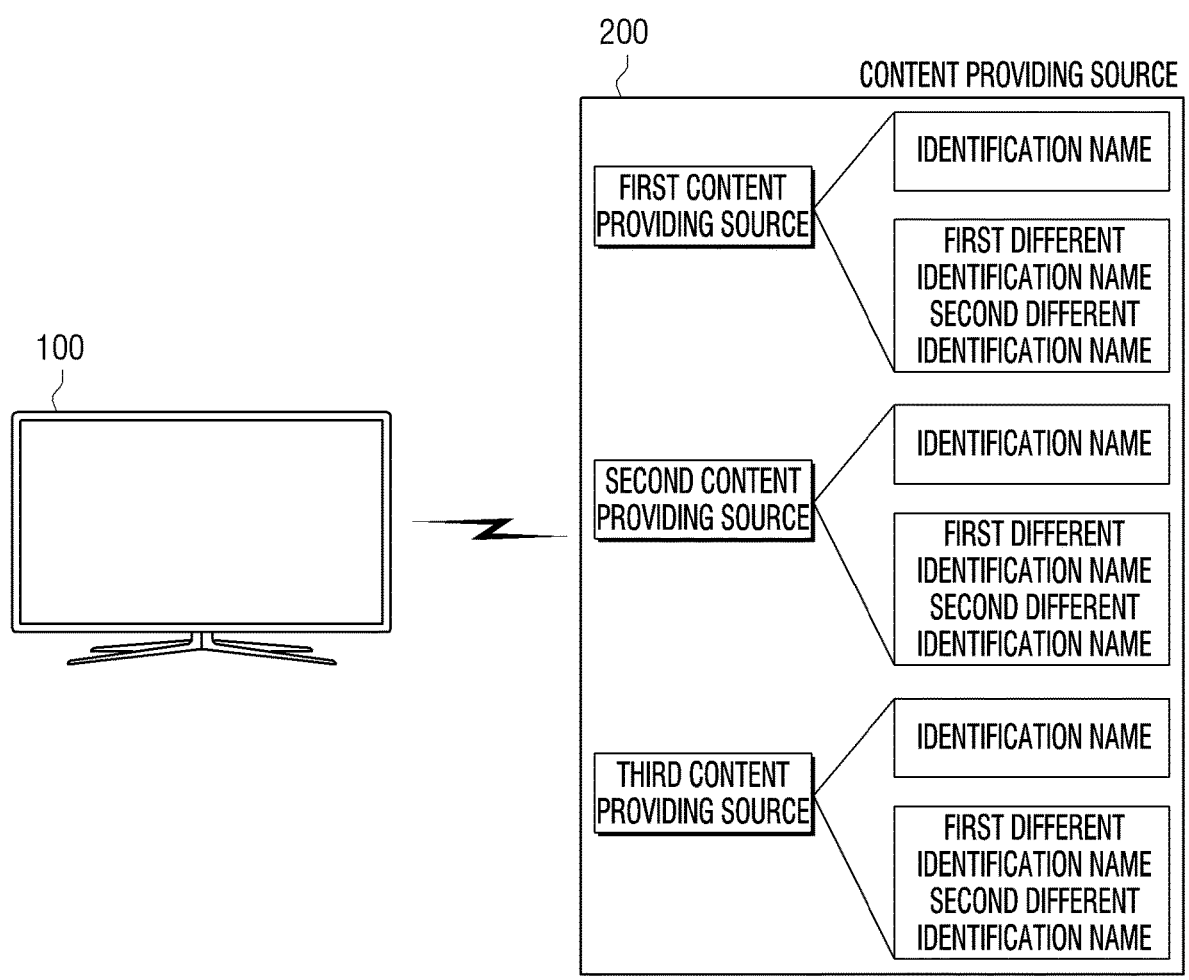
FIG. 4 is a diagram illustrating an example structure in which an electronic apparatus stores an identification name and a different identification name according to an embodiment of the disclosure.

FIG. 4 is a diagram illustrating an example structure in which an example electronic apparatus stores an identification name and a different identification name according to an embodiment of the disclosure.

In FIG. 4, suppose, by way of non-limiting example, that the electronic apparatus 100 is implemented as a TV, and there are a plurality of different identification names. However, the electronic apparatus 100 may be implemented as an apparatus which does not include a display (e.g., a set top box), and there may be one different identification name.

The identification name of the content providing source 200 may be transmitted to the electronic apparatus 100 when the content providing source 200 is connected to the electronic apparatus 100 or when the content providing source 200 is installed in the electronic apparatus 100. Thereafter, the electronic apparatus 100 may obtain information regarding the identification name of the content providing source 200 based on at least one of the identification information of the content providing source 200, the image received from the content providing source 200 or the search result regarding the identification name, map the obtained information onto the different identification name of the content providing source 200 and store the mapping information.

As illustrated in FIG. 4, each identification name of the first content providing source, the second content providing source, and the third content providing source may be transmitted to the electronic apparatus 100 and stored when the content providing source 200 is connected to the electronic apparatus 100 or the content providing source 200 is installed in the electronic apparatus 100. Thereafter, according to various embodiments of the disclosure, the electronic apparatus 100 may obtain and store the first different identification names and the second different identification names regarding the first content providing source, the second content providing source, and the third content providing source.

Accordingly, even if the second different identification name of the first content providing source is included in the user command, the electronic apparatus 100 may recognize that the second different identification name corresponds to the first content providing source and perform the same operation as the case in which the identification name of the first content providing source is included in the user command.

Figure 5:
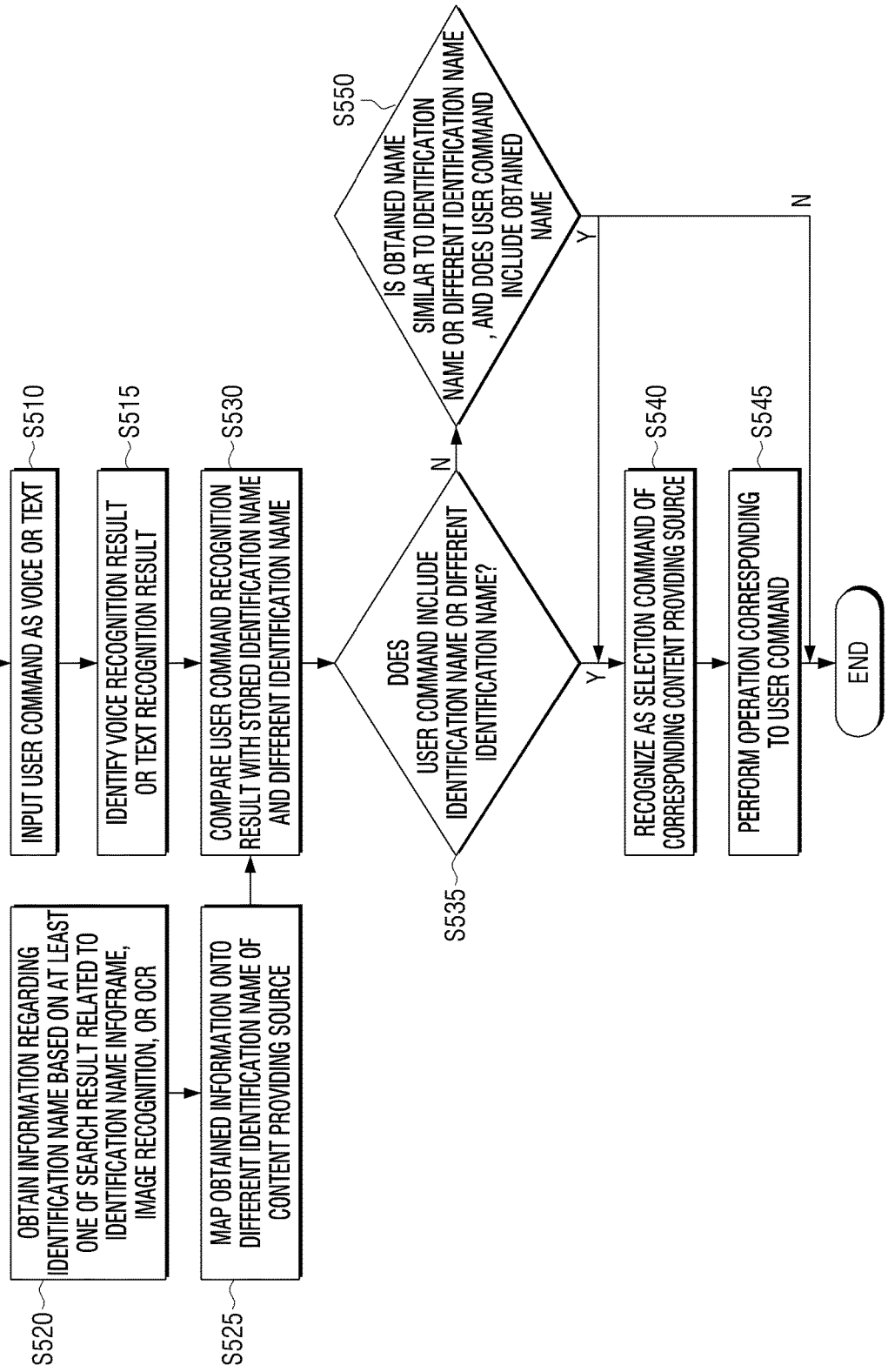
FIG. 5 is a flowchart illustrating an example operation of an electronic apparatus for obtaining a different identification name and processing a user command according to an embodiment of the disclosure.

FIG. 5 is a flowchart illustrating an example operation of an example electronic apparatus for obtaining a different identification name and processing a user command according to an embodiment of the disclosure.

A user command in a form of a voice or a text may be input to the electronic apparatus 100 in S510. The electronic apparatus 100 may recognize a voice recognition result or a text recognition result.

The electronic apparatus 100 may identify the user command through the microphone 160. The microphone may be included in the electronic apparatus 100 or in a remote controller (not illustrated) for controlling the electronic apparatus 100.

According to an embodiment, if a microphone is included in the electronic apparatus 100, the processor (not illustrated) included in the microphone may digitalize the received analogue voice signal and transmit the digital signal to the electronic apparatus 100.

According to another embodiment, if a microphone is included in the remote controller, the processor (not illustrated) included in the remote controller may digitalize the received analogue voice signal and transmit the digital signal to the electronic apparatus 100 through a communication method such as Bluetooth, etc. A remote controller application may be installed in the user terminal apparatus (not illustrated) including a microphone so as to be used as a remote controller.

The electronic apparatus 100 may transmit the digital voice signal to a server (not illustrated) regarding a voice recognition, and recognize the user command based on the voice recognition result received from the server regarding a voice recognition. Here, the server regarding a voice recognition may serve as an STT server that converts a voice signal to a text. The STT server may convert a voice signal into a text and transmit the converted voice recognition result to the electronic apparatus 100.

According to another embodiment, the electronic apparatus 100 may include the STT function and recognize the user command by converting the received voice signal into the text.

The electronic apparatus 100 may obtain information regarding the identification name of the content providing source 200 based on at least one of the identification information of the content providing source 200, the image received from the content providing source 200 or the search result regarding the identification name.

For example, the electronic apparatus 100 may obtain the information regarding the identification name based on at least one of the infoframe, an image recognition, an OCR or a search result regarding the identification name searched through an external server in S520.

The electronic apparatus 100 may map the obtained information onto a different identification name of the content providing source 200 and store the mapping information in S525. Accordingly, the electronic apparatus 100 may recognize that the pre-stored identification name and the different identification name obtained by the above mentioned operation correspond to the same source.

The electronic apparatus 100 may compare the recognition result of the user command with the stored identification name or a different identification name in S530. The electronic apparatus 100 may identify whether a user command includes an identification name or a different identification name in S535.

If the identification name or the different identification name is included in the user command in S535-Y, the electronic apparatus 100 may recognize the user command as a selection command of the content providing source 200 corresponding to the identification name or the different identification name in S540.

For example, suppose, by way of non-limiting example, that the different identification name of the content providing source 200 of which identification name is "AAA" is "BBB". If the user command input to the electronic apparatus 100 is "turn on BBB" or "turn on channel 501 in BBB", the electronic apparatus 100 may identify "BBB" in the user command and recognize the user command as the command for selecting the content providing source 200 corresponding to "BBB".

The electronic apparatus 100 may perform an operation corresponding to the user command in S545. For example, the electronic apparatus 100 may select and execute the content providing source 200 corresponding to "BBB" based on the user command, or execute the content providing source 200 corresponding to "BBB" and execute channel 501 included in the corresponding content providing source 200. Here, the content providing source 200 corresponding to "BBB" is the same as the content providing source 200 corresponding to "AAA". If the identification name, not the different identification name, is included in the user command, the electronic apparatus 100 may execute the content providing source 200 corresponding to the identification name, needless to say.

If the identification name or the different identification name is not included in the user command in S535-N, the electronic apparatus 100 may obtain a name similar to the identification name or the different identification name, and identify whether the obtained name is included in the recognition result of a user command in S550.

The similar name may be the combination of a partial name of the identification name or the different identification name, or the combination of an initial sound or a first letter of each word. For example, if the identification name or the different identification name is "Abc Cde Efg", the similar name may be at least one of "Abc", "Cde", "Efg", "Abc Cde", "Abc Efg", "Cde Efg" or "ACE".

The electronic apparatus 100 may perform an operation for obtaining the similar name before identifying whether the user command includes the identification name or the different identification name, and may receive the similar name from an external server. The similar name may also be a different identification name.

If the name similar to the identification name or the different identification name is included in the user command in S550-Y, the electronic apparatus 100 may recognize the user command as a selection command of the content providing source 200 corresponding to the similar name.

For example, suppose that the identification name of the content providing source 200 is "Abc Cde Efg". The electronic apparatus 100 may obtain different identification names of "BBB, "CCC and "DDD" based on at least one of the identification information of the content providing source 200, the image received from the content providing source 200 or the search result regarding the identification name. If a user command is "turn on ACE", the electronic apparatus 100 may recognize that "Abc Cde Efg", "BBB", "CCC" and "DDD" which are the identification name or the different identification name, are not included in the user command, and obtain the name similar thereto. For example, the electronic apparatus 100 may obtain "ACE" by combining "A", "C", and "E" which are the initial sound or the first letter of each word, identify that the user command includes "ACE", and execute the content providing source 200 corresponding to "ACE", that is, to "Abc Cde Efg".

Figure 6:
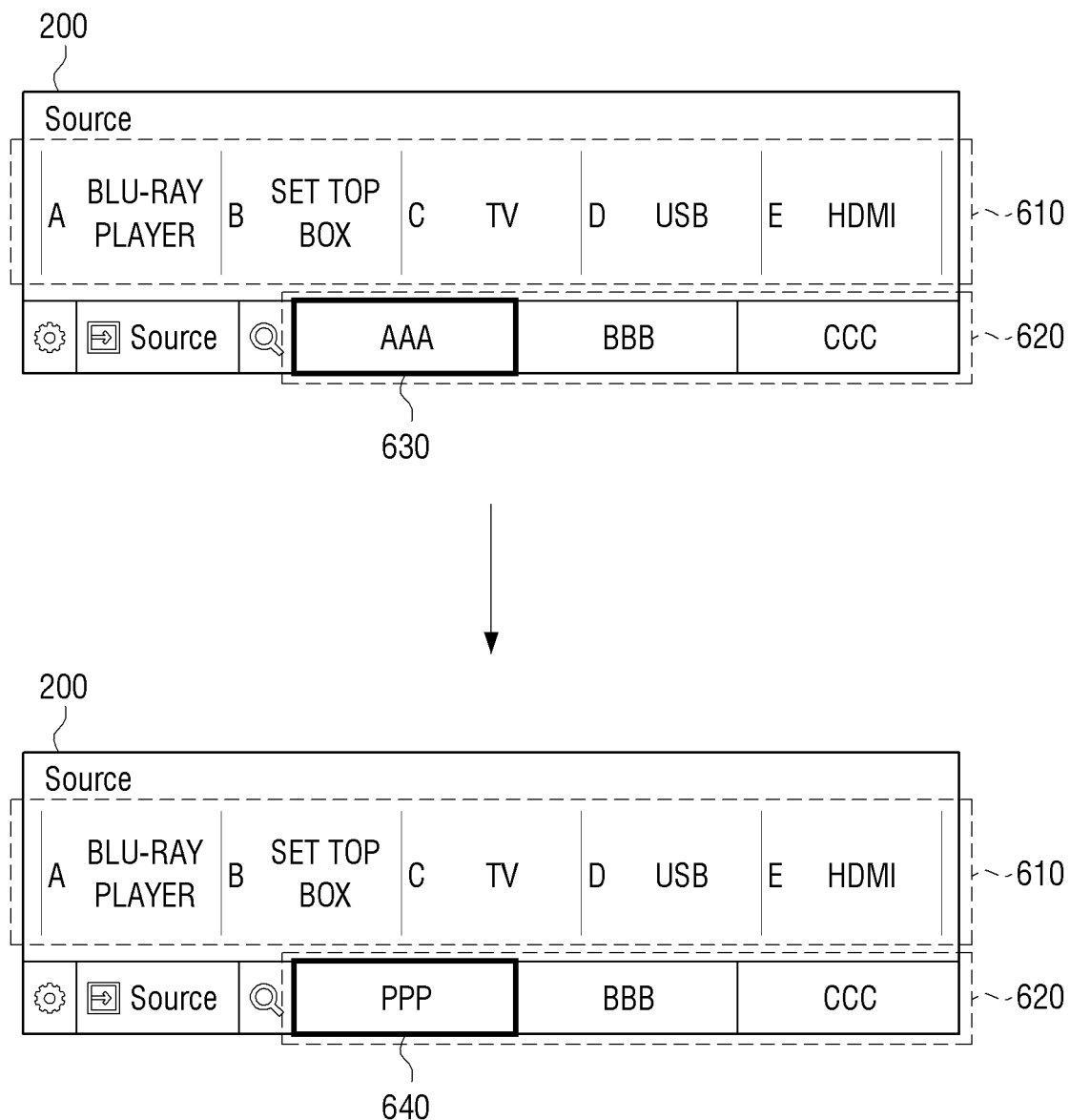
FIG. 6 is a diagram illustrating an example user interface (UI) for indicating a content providing source according to an embodiment of the disclosure.

FIG. 6 is a diagram illustrating an example UI for indicating a content providing source according to an embodiment of the disclosure.

According to FIG. 6, the content providing source 200 may include a content providing apparatus 610 and a content provider 620. The content providing apparatus may be a Blu-Ray player, a set top box, a TV, a USB, a speaker, and a mobile phone which are connected in a wired or wireless communication manner such as an input/output port of the electronic apparatus 100. The content provider may be an application which is installed in the electronic apparatus 100 and provides a content. For example, as in FIG. 6, the identification names such as "Blu-Ray player A", "set top box B", "TV C", "USB D", "AAA", "BBB", "CCC", etc. may be displayed on the display.

If a frequency of use of the different identification name is higher than a frequency of use of the identification name, the electronic apparatus 100 may control the display 140 to provide information on the content providing source 200 based on the different identification name.

For example, the name indicating each content providing source 200 may be displayed on the display 140 by each content providing source 200. For example, on the UI including the plurality of content providing sources 200, the name such as "AAA", "BBB" or "CCC" that indicates each content providing source 200 may be displayed. However, if the frequency of use of "PPP" which is a different identification name of "AAA" 630 is higher than the frequency of use of "AAA", the electronic apparatus 100 may change "AAA" displayed on the UI of the display 140 into "PPP" 640 and display "PPP" 640. The electronic apparatus 100 may provide a convenience to a user by displaying the name mainly used by a user based on the frequency of use of the user.

However, in case a display is not included in the electronic apparatus 100, if the frequency of use of a different identification name is higher than the frequency of use of an identification name, the electronic apparatus 100 may transmit the signal including the information on the content providing source 200 to a display apparatus based on the different identification name.

FIG. 7 is a diagram illustrating an example type of different identification name according to an embodiment of the disclosure.

According to FIG. 7, the type of the different identification name may be a long name and a short name, a service name and a business name, a name before and after merger and acquisition, a manufacturer name, and a multi-lingual translation name. However, the type of different identification name is not limited thereto.

For example, if the identification name is composed of a plurality of words as "Abc Cde Efg", the electronic apparatus 100 may obtain the first letter or an initial sound of each word as a different identification name. For example, the electronic apparatus 100 may obtain "ACE" which is a combination of "A", "C", and "E" as a different identification name. In addition, the electronic apparatus 100 may obtain a part of the identification name as a different identification name. For example, the electronic apparatus 100 may obtain at least one of "Abc", "Cde", "Efg", "Abc Cde", "Abc Efg" or "Cde Efg" as a different identification name.

If a service name is stored as an identification name in the electronic apparatus 100, the electronic apparatus 100 may obtain the business name corresponding to the service name as a different identification name. For example, if a service name of the specific content providing source 200 is "AAA", the electronic apparatus 100 may obtain a different identification name "BBB" as the business name of the content providing source 200 based on at least of the identification information of the content providing source 200, the image received from the content providing source 200 or the search result regarding the identification name.

If the name before merger and acquisition is stored as an identification name in the electronic apparatus 100, the electronic apparatus 100 may obtain the name after the merger and acquisition as a different identification name. For example, if the name before that merger and acquisition is "CCC", the electronic apparatus 100 may obtain "DDD" which is the name after the merger and acquisition.

If the name of a specific language of the content providing source 200 is stored as the identification name, the electronic apparatus 100 may obtain the name in a different language as the different identification name. For example, if "KK TV" is the identification name of a specific content providing source 200, the electronic apparatus 100 may obtain "Korean broadcast" that corresponds to "KKTV" as a different identification name.

Figure 8:
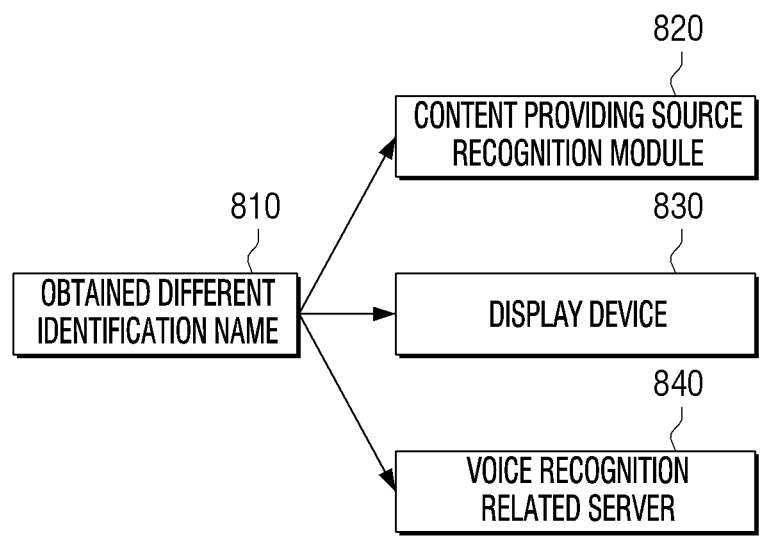
FIG. 8 is a diagram illustrating an example operation for using an obtained different identification name according to an embodiment of the disclosure.

FIG. 8 is a diagram illustrating an example operation of using an obtained different identification name according to an embodiment of the disclosure.

As described above, the electronic apparatus 100 may obtain the different identification name based on at least one of the identification information of the content providing source 200, the image received from the content providing source 200 or the search result regarding the identification name.

Thereafter, according to FIG. 8, the obtained different identification name 810 may be transmitted to the content providing source recognition module 820, the display apparatus 830, and the server regarding a voice recognition 840. The content providing source recognition module 820 may be a module for recognizing the content providing source 200. For example, if a new external apparatus is connected to the electronic apparatus 100 as the content providing source 200, or a new application is installed in the electronic apparatus 100, the content providing source recognition module 820 may recognize the corresponding content providing source based on the identification information, etc.

Even if the content providing source recognition module 820 receives the identification information corresponding to the obtained different identification name 810, not the stored identification name, the content providing source recognition module 820 may recognize that the received identification information is the content providing source which is the same as the stored identification name.

For example, suppose that the stored identification name is "AAA" and the obtained different identification name 810 is "BBB". For an example, if the identification information of the external apparatus connected to the electronic apparatus 100 includes "BBB", the content providing source recognition module 820 may do not recognize "BBB" as a new content providing source and recognize "BBB" as the content providing source which is the same as "AAA". That is, the electronic apparatus 100 may not recognize "BBB" as a new content providing source separately from "AAA".

The electronic apparatus 100 may display the name indicating each content providing source on the display apparatus 830 as illustrated in FIG. 6 described above.

The electronic apparatus 100 may obtain a different identification name and transmit the obtained different identification name to the display apparatus 830, and use the different identification name, not an identification name, as the name displayed on the display apparatus 830.

According to an embodiment, if the frequency of use of the different identification name is higher than the frequency of use of the identification name, the different identification name may be displayed on the display apparatus 830 instead of the identification name.

For example, on the UI including the plurality of content providing sources, the identification name such as "AAA", "BBB" and "CCC" that indicate each content providing source may be displayed. However, if the frequency of use of "PPP" which is a different identification name of "AAA" is higher than the frequency of use of "AAA", the electronic apparatus 100 may transmit a signal for changing "AAA" displayed on the UI into "PPP" to the display apparatus 830.

However, in case the display 140 is included in the electronic apparatus 100, if the frequency of use of a different identification name is higher than the frequency of use of an identification name, the electronic apparatus 100 may control the display 140 so that the different identification name is displayed on the UI.

The electronic apparatus 100 may transmit the obtained different identification name 810 to the server regarding a voice recognition 840.

According to an embodiment, the server regarding a voice recognition 840 is an STT server for converting a voice signal into a text, and may recognize the converted text in addition to converting a voice signal into a text.

For example, suppose that the stored identification name is "AAA" and the obtained different identification name 810 is "BBB". For example, if "BBB" is included in the user command, the server regarding a voice recognition 840 may do not recognize "BBB" as a new content providing source and recognize "BBB" as the content providing source which is the same as "AAA", and transmit the voice recognition result corresponding to the user command to the electronic apparatus 100.

Figure 9:
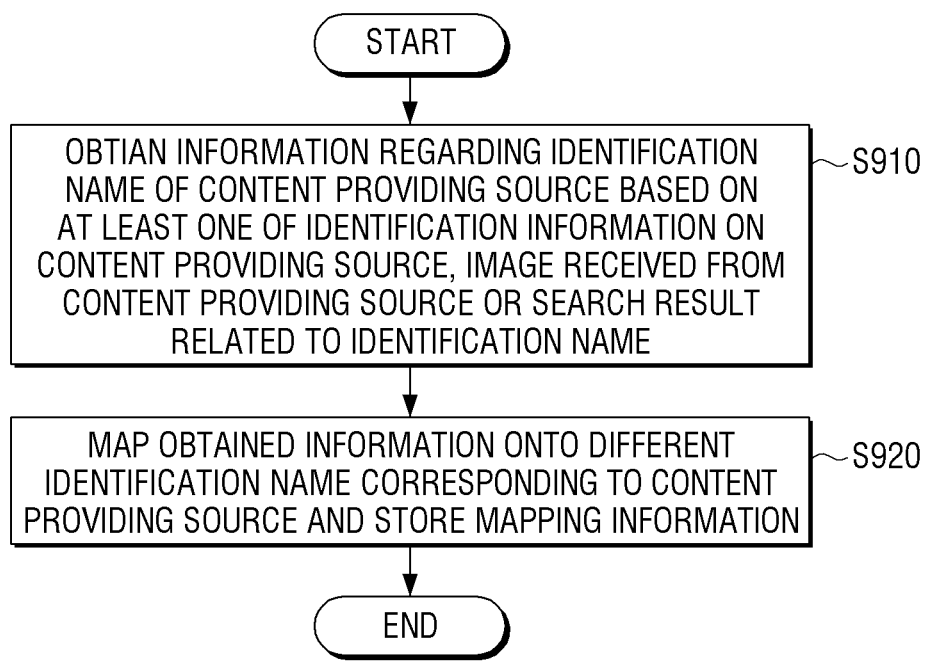
FIG. 9 is a flowchart illustrating an example method for controlling an electronic apparatus according to an embodiment of the disclosure.

FIG. 9 is a flowchart illustrating an example method for controlling an electronic apparatus according to an embodiment of the disclosure.

According to FIG. 9, the electronic apparatus which stores information in which the identification name corresponding to the content providing source 200 is mapped, may obtain information regarding the identification name of the content providing source 200 based on at least one of the identification information of the content providing source 200, the image received from the content providing source 200 or the search result regarding the identification name, in S910. The identification information may be information included in an infoframe.

In addition, the content providing source 200 may include at least one of a content provider or a content providing apparatus. The content provider may be an application installed in an electronic apparatus and which provides a content, and the content providing apparatus may be implemented as a set top box, a Blu-Ray player, a speaker, and a mobile phone which are connected to the electronic apparatus.

The electronic apparatus may obtain the information related to the identification name of the content providing source 200 by performing image processing on a predetermined logo area of the received image.

The electronic apparatus may map the obtained information onto a different identification name of the content providing source 200 and store the mapping information in S920.

The electronic apparatus may transmit a keyword related to the identification name and a keyword related to a change of the identification name to an external server, and if a search result regarding the identification name and a search result regarding the keyword is received from the external server, may map the information included in the search result onto a different identification name of the content providing source 200, and store the mapping information.

If the different identification name is included in a user command, the electronic apparatus may recognize the user command as a selection command of the content providing source 200 and perform the operation corresponding to the user command.

The user command may be a voice command of a user. That is, if the different identification name is included in a text corresponding to the voice recognition result regarding a user voice command, the electronic apparatus may recognize the user command as a selection command of the content providing source 200 and perform the operation corresponding to the user command.

The electronic apparatus 100 may identify the user command through a microphone 160. The microphone may be included in the electronic apparatus 100 or in a remote controller (not illustrated) for controlling the electronic apparatus 100.

According to an embodiment, if a microphone is included in the electronic apparatus 100, the processor (not illustrated) included in the microphone may digitalize the received analogue voice signal and transmit the digital signal to the electronic apparatus 100.

According to another embodiment, if a microphone is included in the remote controller, the processor (not illustrated) included in the remote controller may digitalize the received analogue voice signal and transmit the digital signal to the electronic apparatus 100 through a communication method such as Bluetooth, etc. In addition, a remote controller application may be installed in the user terminal apparatus (not illustrated) including a microphone so as to be used as a remote controller.

The electronic apparatus 100 may transmit the digital voice signal to a server (not illustrated) regarding a voice recognition, and recognize the user command based on the voice recognition result received from the server regarding a voice recognition. The server regarding a voice recognition may serve as a STT server that converts a voice signal to a text. The STT server may convert a voice signal into a text and transmit the converted voice recognition result to the electronic apparatus 100.

According to another embodiment, the electronic apparatus 100 may include the STT function and recognize the user command by converting the received voice signal into the text.

However, it is not limited thereto and the user command may be a command input as a text.

If there are a plurality of different identification names, the electronic apparatus may assign a priority order to the plurality of different identification names based on a frequency of use of the plurality of different identification names, and map the plurality of different identification names onto the content providing source.

If a user command is input, the electronic apparatus may identify whether the user command includes the different identification name by comparing the user command with the plurality of different identification names in sequence based on the priority order.

For example, suppose that there are three different identification names, "BBB", "CCC", and "DDD". The electronic apparatus may identify the frequency of use of the different identification names in the user command, and assign the priority order based on the frequency of use. For example, if the frequency of use of "BBB" is the highest, that of "CCC" is the next highest and that of "DDD" is the lowest, the electronic apparatus may assign the highest priority order to "BBB" and assign the lowest priority order to "DDD".

The electronic apparatus may compare the user command with "BBB" to which the highest priority order is assigned, first, and compare the user command with "CCC", and then compare the user command with "DDD" so as to identify whether different identification name is included in the user command. For example, if the user command input to the electronic apparatus is "turn on BBB" or "turn on channel 501 on BBB", the electronic apparatus may compare the user command with "BBB" of which priority order is the highest first, and identify whether the corresponding different identification name is included in the user command. As the electronic apparatus compares the user command according to the priority order, the burden of calculation in the electronic apparatus may be reduced.

If a frequency of use of the different identification name is higher than a frequency of use of the identification name, the electronic apparatus may provide information on the content providing source 200 based on the different identification name.

The specific operations in each stage have been described above, and thus, the detailed descriptions thereof will not be repeated here.

At least some configurations of the methods according to the above-described various example embodiments may be realized as applications that may be installed in the existing electronic apparatus.

Further, at least some configurations of the methods according to the above-described various example embodiments may be realized by upgrading the software or hardware of the existing electronic apparatus.

In addition, at least some configurations of the above-described various example embodiments may be executed through an embedded server in the electronic apparatus or through an external server outside the electronic apparatus.

Various embodiments described above may be implemented in a recording medium that may be read by a computer or a similar apparatus to the computer using software, hardware, or any combination thereof. In some cases, embodiments that are described in the disclosure may be embodied as the processor itself. In a software embodiment, various embodiments described in the disclosure such as a procedure and a function may be implemented as separate software modules. Each of the software modules may respectively perform one or more functions and operations described in the embodiments.

Computer instructions for performing a process operation according to various example embodiments described above may be stored in a non-transitory computer readable medium. If the computer instructions stored in the non-transitory computer-readable medium are executed by a processor, the computer instructions cause a specific apparatus to perform processing operation according to various example embodiments described above.

If the computer instructions are executed by the processor of the electronic apparatus, the operation of the non-transitory computer-readable medium that stores the computer instructions which cause the electronic apparatus to perform an operation, may include the operation for obtaining the information regarding the identification name of the content providing source based on at least one of identification information of the content providing source, image received from the content providing source or a search result regarding the identification name, and the operation for mapping the obtained information onto a different identification name of the content providing source and storing the mapping information.

The non-transitory computer readable medium is a medium that stores data semi-permanently and which is readable by an apparatus. Examples of the non-transitory computer-readable medium may include CD, DVD, hard disc, Blu-ray disc, USB, a memory card, ROM, or the like.

The electronic apparatus may perform an operation for obtaining the above described different identification name based on Convolutional Neural Network or Recurrent Neural Network.

Although various example embodiments of the disclosure have been illustrated and described hereinabove, the disclosure is not limited to the above-mentioned embodiments, and may be variously modified by those skilled in the art to which the disclosure pertains without departing from the scope and spirit of the disclosure as set forth, for example, in the accompanying claims. These modifications should also be understood to fall within the scope of the disclosure.

What is claimed is:

1. An electronic apparatus comprising:
a memory configured to store information related to an identification name corresponding to a content providing source;
a communicator comprising communication circuitry; and
a processor coupled to the memory and the communicator, the processor configured to control the electronic apparatus to:
obtain information related to the identification name of the content providing source based on at least one of: identification information of the content providing source received from the content providing source through the communicator, an image received from the content providing source through the communicator and a search result regarding the identification name received through the communicator,
map the obtained information onto a plurality of different identification names corresponding to the content providing source,
store mapping information in the memory,
assign a priority order to the plurality of different identification names based on a frequency of use of the plurality of different identification names,
receive a user command from an input device,
determine whether the user command includes one of the different identification names of the plurality of different identification names by comparing the user command with the plurality of different identification names based on the priority order of the plurality of different identification names,
recognize the user command as a selection command of the content providing source based on the different identification name being included in the user command, and
control the electronic apparatus to perform an operation corresponding to the user command.

2. The electronic apparatus as claimed in claim 1, wherein the operation corresponding to the user command includes selecting and executing the content providing source from a plurality of available content providing sources.

3. The electronic apparatus as claimed in claim 1, wherein the user command includes a voice command of a user, and
wherein the processor is configured to recognize the user voice command as a selection command of the content providing source based on the different identification name being included in a text corresponding to a voice recognition result regarding the user voice command, and to perform an operation corresponding to the user command.

4. The electronic apparatus as claimed in claim 1, wherein the processor is configured to control the electronic apparatus to transmit a keyword related to the identification name and a keyword related to a change of the identification name to an external server, and to map information included in a search result onto a different identification name of the content providing source based on the search result regarding the identification name and a search result regarding the keyword related to the identification name received from the external server, and to store the mapping information.

5. The electronic apparatus as claimed in claim 1, wherein the processor is configured to control the electronic apparatus to obtain information related to the identification name of the content providing source by performing an image processing on a predetermined logo area of the received image.

6. The electronic apparatus as claimed in claim 1, wherein the comparing of the user command with the plurality of different identification names is performed in sequence based on the priority order.

7. The electronic apparatus as claimed in claim 1, further comprising:
a display,
wherein the processor is configured to control the display to provide information on the content providing source based on the different identification name based on a frequency of use of the different identification name being higher than a frequency of use of the identification name.

8. The electronic apparatus as claimed in claim 1, wherein the processor is configured to recognize a user command as a selection command of a content providing source corresponding to the identification name or the different identification name based on a subordinate name of the identification name or a subordinate name of the different identification name of the plurality of different identification names being included in the user command.

9. The electronic apparatus as claimed in claim 8, wherein the processor is configured to provide a user interface (UI) for obtaining a selection of one of a plurality of content providing sources based on there being a plurality of content providing sources corresponding to the subordinate name.

10. The electronic apparatus as claimed in claim 1, wherein the identification information is information included in an infoframe.

11. The electronic apparatus as claimed in claim 1, wherein the content providing source is configured to include at least one of: a content provider and a content providing apparatus.

12. An electronic apparatus comprising: a memory configured to store information related to an identification name corresponding to a content providing source of a plurality of content providing source;
  a communicator comprising communication circuitry; and
  a processor coupled to the memory and the communicator, the processor configured to control the electronic apparatus to:
    obtain information related to the identification name of the content providing source based on at least one of: identification information of the content providing source, an image received from the content providing source and a search result regarding the identification name received through the communicator,
    map the obtained information onto a different identification name corresponding to the content providing source,
    store mapping information in the memory,
  assign a priority order to the plurality of content providing sources based on a frequency of selection by a user,
  receive a user command from an input device,
  recognize the user command as a selection command of a content providing source of the plurality of content providing sources based on a subordinate name of the identification name or a subordinate name of the different identification name being included in the user command;
  based on there being a plurality of content providing sources corresponding to the subordinate name of the identification name or the subordinate name of the different identification name, recognize the user command as a selection command of a content providing source having a highest priority order among the plurality of content providing sources based on the subordinate name being included in the user command.

13. A method for controlling an electronic apparatus storing information related to an identification name corresponding to a content providing source, the method comprising:
  obtaining information related to the identification name of the content providing source based on at least one of: identification information of the content providing source received from the content providing source, an image received from the content providing source and a search result regarding the identification name;
  mapping the obtained information onto a plurality of different identification names corresponding to the content providing source;
  storing the mapping information;
  assigning a priority order to the plurality of different identification names based on a frequency of use of the plurality of different identification names;
  receiving a user command from an input device;
  determining whether the user command includes one of the different identification names of the plurality of different identification names by comparing the user command with the plurality of different identification names based on the priority order of the plurality of different identification names;
  recognizing the user command as a selection command of the content providing source based on the different identification name being included in the user command; and
  controlling the electronic apparatus to perform an operation corresponding to the user command.

14. The controlling method as claimed in claim 13, wherein controlling the electronic apparatus includes selecting the content providing source from a plurality of available content providing source and executing the selected content providing source.

15. The controlling method as claimed in claim 13, wherein the user command includes a voice command of a user, and
  wherein the performing an operation includes recognizing the user voice command as a selection command of the content providing source based on the different identification name being included in a text corresponding to a voice recognition result regarding the user voice command, and performing an operation corresponding to the user command.

16. The controlling method as claimed in claim 13, wherein the storing includes transmitting a keyword related to the identification name and a keyword related to a change of the identification name to an external server, and mapping information included in a search result onto a different identification name of the content providing source based on the search result regarding the identification name and a search result regarding the keyword related to the identification name being received from the external server, and storing the mapping information.

17. The controlling method as claimed in claim 13, wherein the obtaining information includes obtaining information related to the identification name of the content providing source by performing an image processing on a predetermined logo area of the received image.

18. The controlling method as claimed in claim 13, wherein,
  comparing the user command with the plurality of different identification names is performed in sequence based on the priority order.

19. The controlling method as claimed in claim 13, further comprising:
  providing information on the content providing source based on the different identification name based on a frequency of use of the different identification name being higher than a frequency of use of the identification name.

20. A non-transitory computer readable medium having recorded thereon instructions that, when executed by a processor of an electronic apparatus, causes the electronic apparatus to perform operations, comprising:
  obtaining information related to identification name of a content providing source based on at least one of: identification information of the content providing source received from the content providing source, an image received from the content providing source and a search result regarding the identification name;
  mapping the obtained information onto a plurality of different identification names corresponding to the content providing source;

storing the mapping information;
assigning a priority order to the plurality of different identification names based on a frequency of use of the plurality of different identification names;
receiving a user command from an input device;
determining whether the user command includes one of the different identification names of the plurality of different identification names by comparing the user command with the plurality of different identification names based on the priority order of the plurality of different identification names;
recognizing the user command as a selection command of the content providing source based on the different identification name being included in the user command; and
controlling the electronic apparatus to perform an operation corresponding to the user command.

* * * * *